(12) United States Patent
Neuman

(10) Patent No.: US 8,184,137 B2
(45) Date of Patent: May 22, 2012

(54) SYSTEM AND METHOD FOR ORDERING OF SCALING AND CAPTURING IN A VIDEO SYSTEM

(75) Inventor: Darren Neuman, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 1207 days.

(21) Appl. No.: 11/300,782

(22) Filed: Dec. 15, 2005

(65) Prior Publication Data

US 2007/0139559 A1 Jun. 21, 2007

(51) Int. Cl.
*G09G 5/02* (2006.01)
(52) U.S. Cl. ........... 345/698; 345/660; 345/3.3; 345/3.4
(58) Field of Classification Search .................. 345/660, 345/698, 699, 3.3, 3.4; 370/229, 395.64–395.65
See application file for complete search history.

(56) References Cited

U.S. PATENT DOCUMENTS

| | | | | |
|---|---|---|---|---|
| 5,796,442 A * | 8/1998 | Gove et al. | ..................... | 348/556 |
| 6,538,656 B1 * | 3/2003 | Cheung et al. | ................ | 345/519 |
| 6,573,905 B1 * | 6/2003 | MacInnis et al. | ............. | 345/629 |
| 6,697,341 B1 * | 2/2004 | Roy | ............................... | 370/260 |
| 6,768,774 B1 * | 7/2004 | MacInnis et al. | ........ | 375/240.15 |
| 2004/0246377 A1 * | 12/2004 | Matoba et al. | ................ | 348/581 |

* cited by examiner

*Primary Examiner* — Michelle K Lay
(74) *Attorney, Agent, or Firm* — Thomas, Kayden, Horstemeyer & Risley, LLP

(57) ABSTRACT

Various aspects of processing video information in a display controller may comprise calculating a decision value for a current field based on a video format of the current field and an output video format. The decision value may be compared to a threshold value. In instances where the decision value is greater than said threshold value, scaling may be performed prior to performing capturing. In instances where the decision value is less than said threshold value, capturing may be performed before performing scaling.

21 Claims, 10 Drawing Sheets

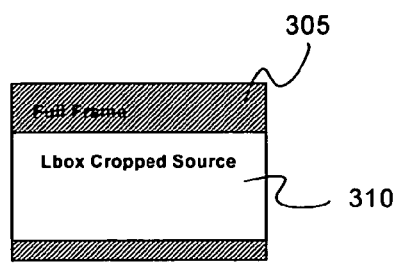
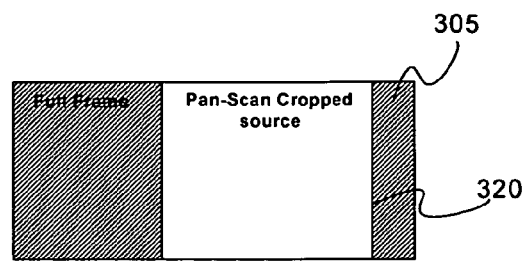
Fig. 3a    Fig. 3b
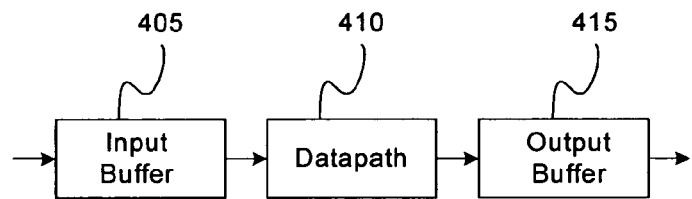
Fig. 4

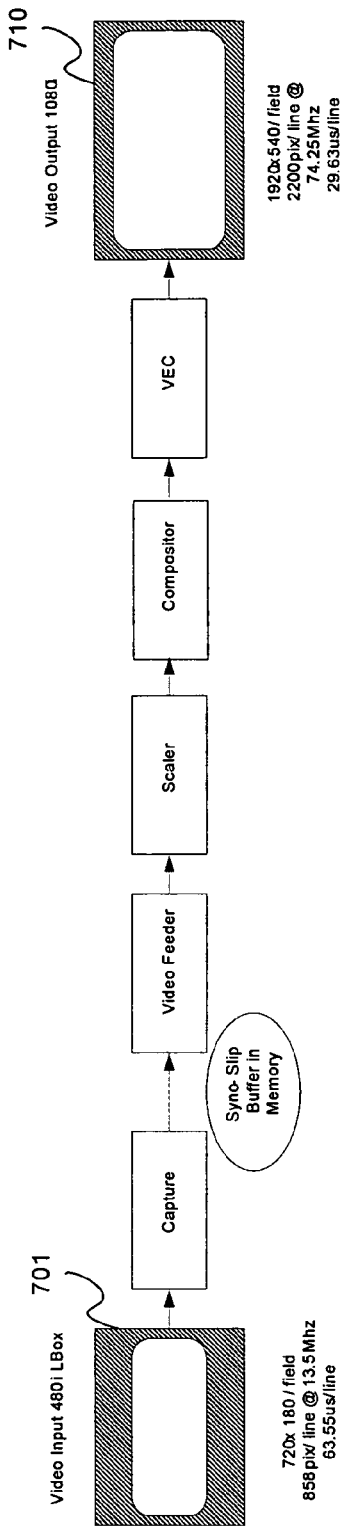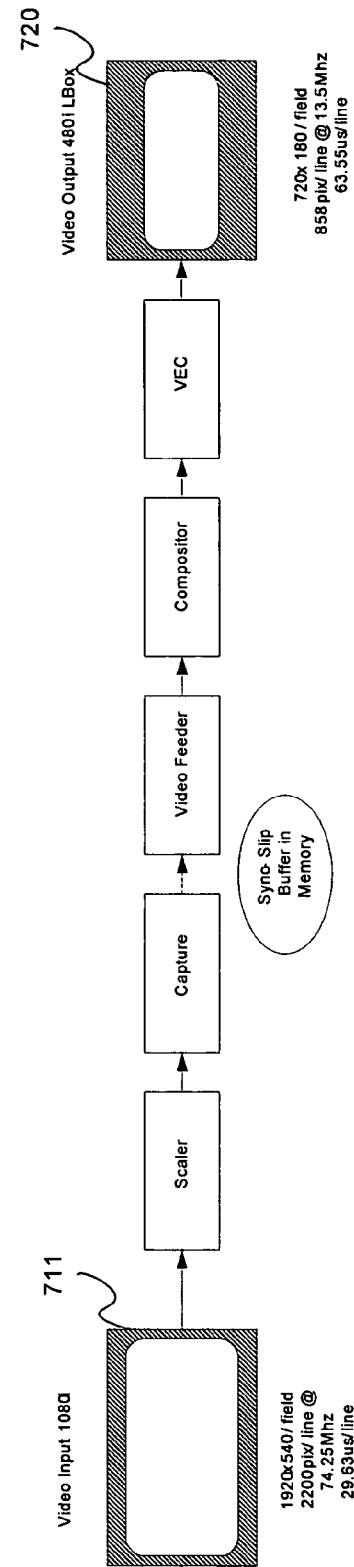
Fig. 7a
Fig. 7b

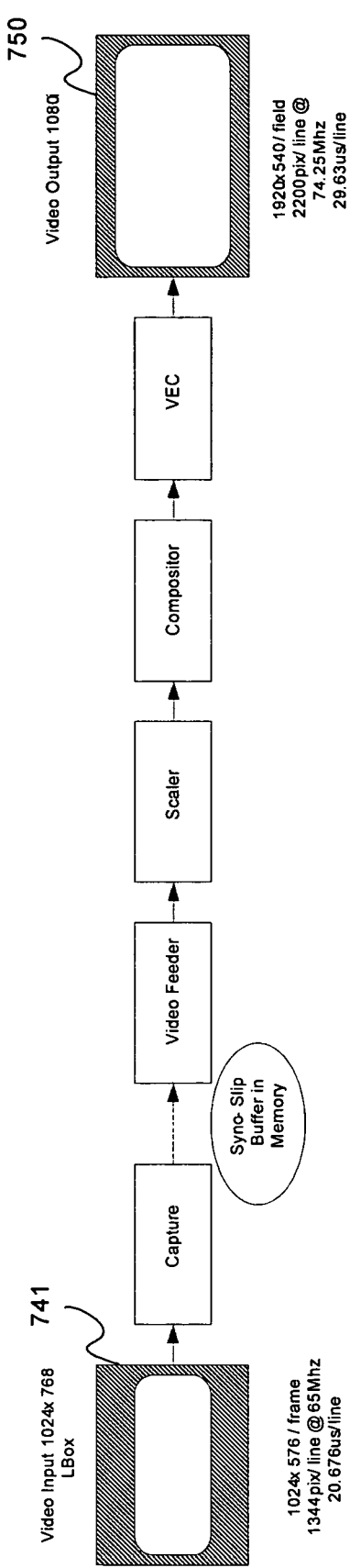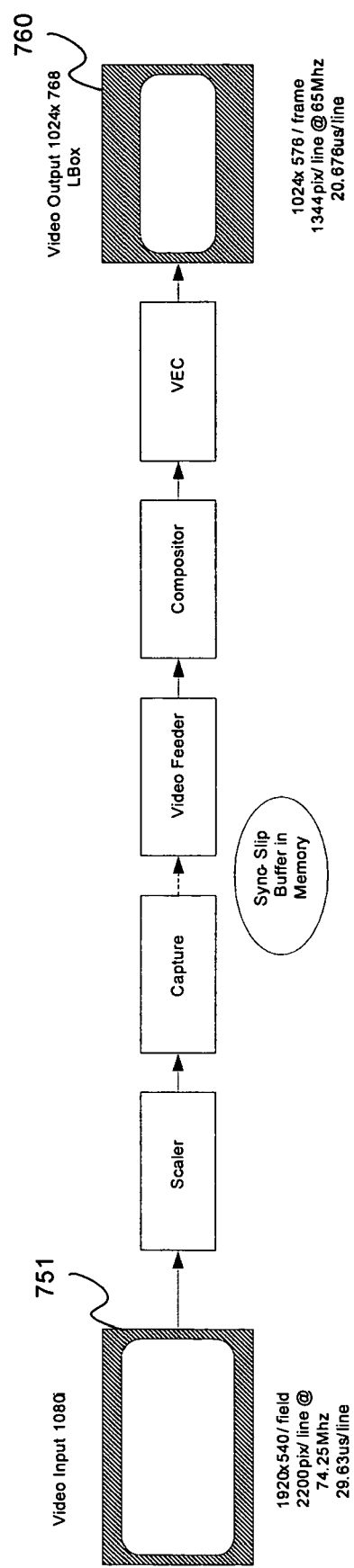
Fig. 7e
Fig. 7f

SYSTEM AND METHOD FOR ORDERING OF SCALING AND CAPTURING IN A VIDEO SYSTEM

RELATED APPLICATIONS

This application is related to the following applications, each of which is hereby incorporated herein by reference in its entirety:

U.S. patent application Ser. No. 10/314,525 filed Dec. 9, 2002; and

U.S. patent application Ser. No. 11/308,244 filed Mar. 14, 2006.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the present invention relate to processing video signals. More specifically, certain embodiments of the invention relate to a method and system for ordering of scaling and capturing in a video system.

BACKGROUND OF THE INVENTION

Generally in video systems video is captured and stored in memory, and fed into a video processing unit before being sent out for display on a video output device. Processing can involve such functions as, for example, scaling, compositing, and format conversion. Scaling can be horizontal and/or vertical, where scaling in one direction can involve increasing or decreasing the pixels per line, thus increasing or decreasing the size of an image and its format. Compositing can involve overlaying the video with a layer of graphics or text.

In some instances, the size of the video captured is larger before processing than afterwards. In such instances, the system uses more bandwidth for capturing the video than may be necessary. In other instances, capturing the video before processing is more efficient, since some scaling and format change can convert the video to a size or format that requires more bandwidth.

Video systems can be designed to capture the live video stream first, perform processing, then display the video, or process the live streaming video, capture it into memory, then display it. However, most video systems receive live streaming video that can have different formats at the input and different sizes. Processing is used to ensure optimal display of the video. As a result, while capturing-processing-displaying is efficient for certain portions of the video stream, such a sequence of actions can be inefficient for other portions of the video stream. As a result, the system can unnecessarily waste system resources to capture more information than needed. Similarly, a system can be designed to perform processing-capturing-displaying of the video, but that sequence can be efficient for some portions of the video and not efficient for other portions of the same video.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for processing video, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

BRIEF DESCRIPTION OF SEVERAL VIEWS OF THE DRAWINGS

FIG. 3a illustrates an exemplary letterbox cropped source, in accordance with an embodiment of the present invention.

FIG. 3b illustrates an exemplary pan-scan cropped source, in accordance with an embodiment of the present invention.

FIG. 4 illustrates a flow diagram of an exemplary display pipeline, in accordance with an embodiment of the present invention.

FIG. 7a-f illustrate examples of the impact of different decisions in video input capture scaling/cropping, in accordance with an embodiment of the present invention.

DETAILED DESCRIPTION OF THE INVENTION

Certain embodiments of the present invention relate to performing the capturing and processing in a video stream in an order most efficient for the system resources. Various aspect of processing video information in a display controller may comprise calculating a decision value for a current field based on a video format of the current field and an output video format. The decision value may be compared to a threshold value. In instances where the decision value is greater than said threshold value, scaling may be performed prior to performing capturing. In instances where the decision value is less than said threshold value, capturing may be performed before performing scaling.

Figure 1A:
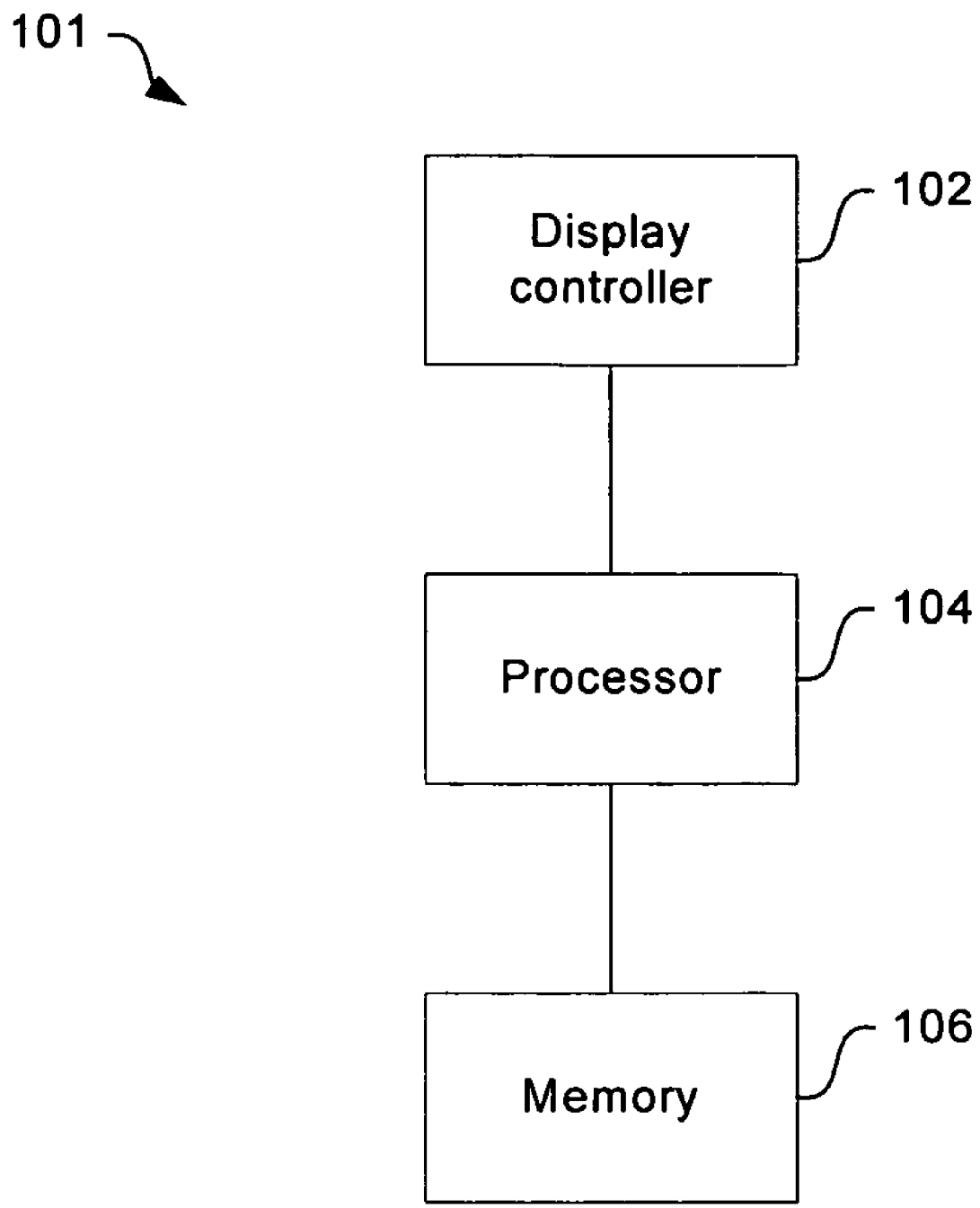
FIG. 1a illustrates a block diagram of an exemplary architecture for positioning of a display controller, in accordance with an embodiment of the present invention.

FIG. 1a illustrates a block diagram of an exemplary architecture for positioning of a display controller, in accordance with an embodiment of the present invention. Referring to FIG. 1a, the display system 101 may comprise a display controller 102, a processor 104, and a memory 106. The display controller 102 may comprise suitable logic, code, and/or circuitry that may be adapted to display video frames/fields. The display controller may be utilized in a video network (VN) and may have the capability to accept different inputs as video sources such as, for example, MPEG, VDEC, ITU-656, and HD-VDI sources. The processor 104 may comprise suitable logic, code, and/or circuitry that may be adapted to control the operation of the display controller 102 and to transfer control information and/or data to and from the memory 106. The memory 106 may comprise suitable logic, code, and/or circuitry that may be adapted to store control information, data, and information regarding video frames/fields.

The processor 104 may be capable of performing calculations associated with a video frame/video based on the input and output video format and making decisions based on calculated values. The decisions made by the processor 104 may be, for example, regarding the order in which scaling and capturing of the video frames/fields are to be performed. The decision may be determined by comparing a calculated value to a threshold. If the calculated value is greater than the threshold, the processor 104 may scale the video frame/field prior to capturing it to memory. In the alternative, if the calculated value is smaller than the threshold, the processor 104 may capture the video frame/field to memory before scaling it.

In an embodiment of the present invention, the processor 104 may determine the decision value based on: input and output video dimensions, input and output line samples per horizontal line, and/or input and output pixel clocks.

Figure 1B:
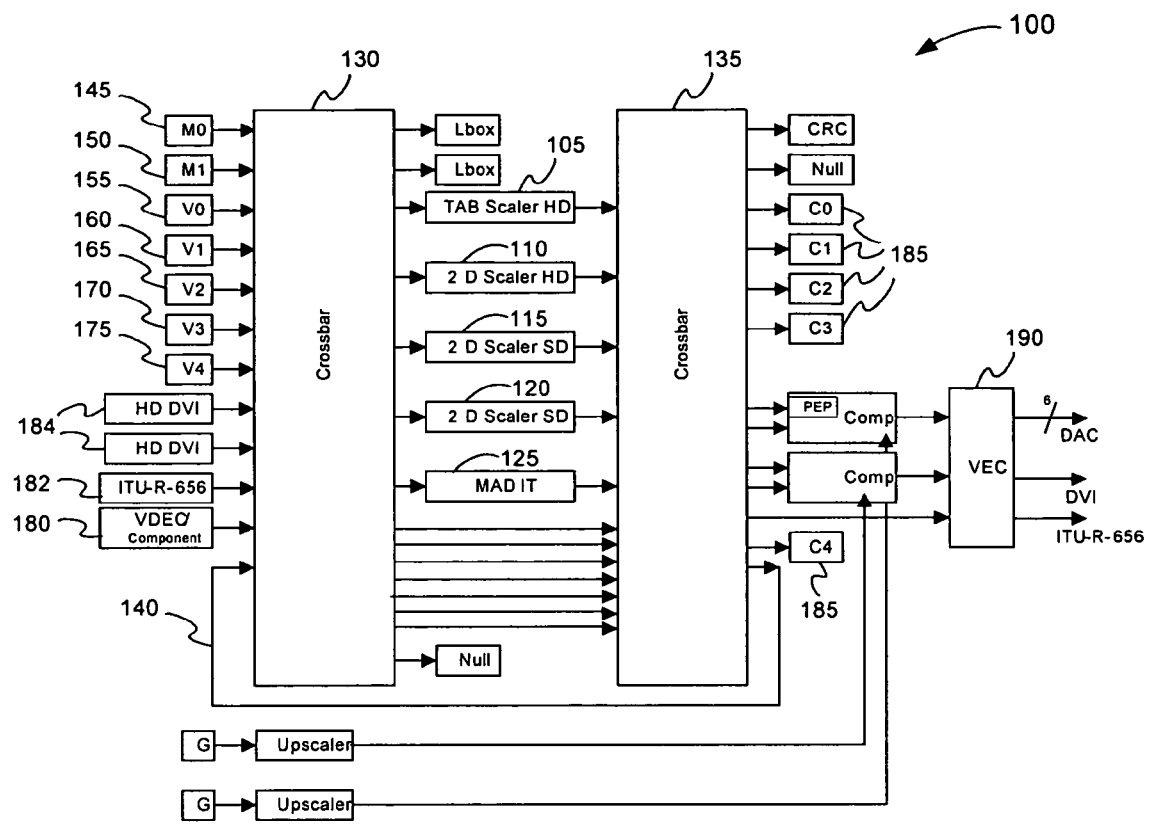
FIG. 1b illustrates a block diagram of an exemplary architecture of the display controller of FIG. 1a, in accordance with an embodiment of the present invention.

FIG. 1b illustrates a block diagram of an exemplary architecture of the display controller 100 of FIG. 1a, in accordance with an embodiment of the present invention. The display controller 100 may be clocked with a single clock, which may be, for example, a 108 MHz clock. A motion adaptive deinterlacer with inverse telecine 3:2/2:2 (MAD-IT) 125 along with a plurality of scalers (105, 110, 115, and 120), for example, may be positioned between a first crossbar 130 and a second crossbar 135. The first crossbar 130 may be referred to as an input crossbar and the second crossbar 135 may be referred to as an output crossbar.

U.S. patent application Ser. No. 10/314,525 filed Dec. 9, 2002 entitled "Network Environment for Video Processing Modules" discloses an exemplary crossbar network module and associated system, which is representative of the video network crossbar that may be utilized in connection with the present invention. Accordingly, U.S. patent application Ser. No. 10/314,525 filed Dec. 9, 2002 is hereby incorporated herein by reference in its entirety.

A feedback path 140 may be provided from the output of the second crossbar 135 to the input of the first crossbar 130. This may allow any of the standard definition (SD) video sources such as the MPEG feeders 145 and 150, video feeders 155, 160, 165, 170 and 175, and/or video decoder (VDEC) 180, and so on, to function as an input to the MAD-IT 125 and/or one of the scalers 105, 110, 115, and 120. The VDEC 180 may be an analog video decoder that may process NTSC signals to separate the chroma color components from the luma color components. The MPEG feeders 145 and 150 may accept 4:2:0 and 4:2:2 video data and supply 4:2:2 video data. The video feeders 155, 160, 165, 170 and 175, may accept 4:2:2 video data and supply 4:2:2 video data. The output of the second crossbar 135 may be passed back to the first crossbar 130 via the feedback path 140.

A scaler such as, for example, scaler 105, 110, 115, or 120, may contain a line buffer that stores a plurality of lines of pixels for vertical scaling. The scaler may have, for example, a line buffer of 4×1280 pixels. Such a line buffer may be reconfigurable and may as a result be used to alleviate the RTS bandwidth of different scaling scenarios. For example, to scale down a picture by four in the vertical direction, a vertical scaler may produce one line for every four input lines. A portion of the line buffer may be placed after the vertical scaler to spread the data burst across multiple lines; thus lowering the output bandwidth.

Pixels for incoming streaming video may be captured as 4:2:2 YCrCb, for example. Video sources may utilize video capture to store the source to memory. A capture to memory function may be utilized. Capturing to memory may allow sync-slip to produce correct output frame rates, because input sources may not always be frame accurate to tolerance needed for NTSC or PAL output. Additionally, input sources may require cropping and scaling that cannot be done directly from input to output, and picture-in-graphic (PIG) windows require availability of all input pixels in order to scale the output. Storing the pixels in memory may ensure appropriate handling of these functions. Furthermore, capturing to memory may ensure appropriate time shifting of input sources and vertical or horizontal shifting of an output window anywhere on the screen. The video capture functions may be performed by a capture engine and related functions, which may be found in capture blocks 185.

A video feeder such as, for example, video feeders 155, 160, 165, 170 and 175, may fetch pictures captured in the main memory. The MPEG feeders 145 and 150 may have the capability to support 4:2:0 to 4:2:2 conversions. Standard video feeders may be used to play captured video from live sources, or to playback captured video from scaled MPEG sources (PIG and PIP windows).

The VDEC 180, ITU-656 input 182 and HD-DVI input port 184 may be forms of video input ports, and may sample and format video data arriving at fixed clock rates into the device. The modules of the video input ports may provide format information to software, provide various sync mechanisms to time-base blocks, and provide error recovery mechanisms to make the system robust to various input errors. Video from the video input ports may be scaled then captured or captured directly.

The video encoder (VEC) 190 may be adapted to function as a primary video output for the video network. The VEC 190 may resample data, insert timing, blanking and sync information, and modulate chroma where necessary for NTSC and PAL outputs. The video output to the VEC 190 may be output by a video feeder directly or output by the video feeder, scaled, then sent to the VEC 190. The display controller 100 may support several modes of display. Some exemplary display modes may comprise full screen (Full), picture-in-picture (PIP), and picture-in-graphic (PIG).

In the full display mode, an input stream may be displayed utilizing a whole screen. Some scaling may be used to match the display resolution and aspect ratio. For example, a 1080i input stream may be scaled to 704×180 per field for a NTSC display. Full screen may include letterbox conversion on 4:3 displays, pillarbox conversion on 16:9 displays, pan scan conversion on 4:3 displays, non-linear horizontal display, and anamorphic 16:9 output on 4:3 display.

Figure 2A:
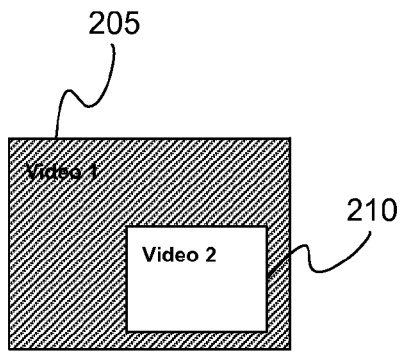
FIG. 2a illustrates an exemplary window PIP display, in accordance with an embodiment of the present invention.
Figure 2B:
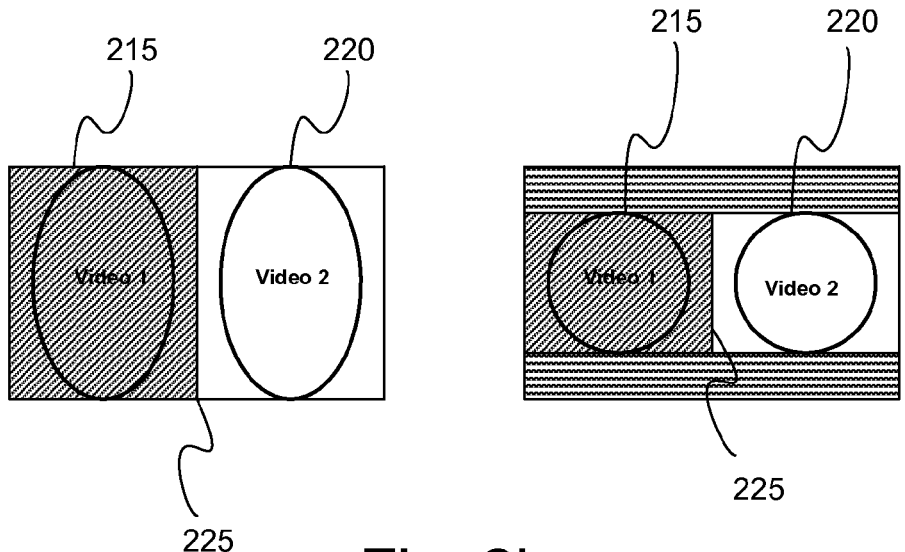
FIG. 2b illustrates an exemplary side-by-side PIP display, in accordance with an embodiment of the present invention.
Figure 2C:
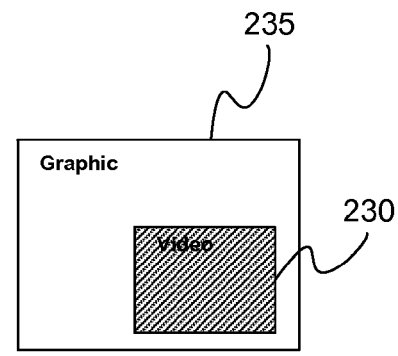
FIG. 2c illustrates an exemplary PIG display, in accordance with an embodiment of the present invention.

In the PIP mode, two video windows may be displayed on a screen. FIG. 2a illustrates an exemplary window PIP display, in accordance with an embodiment of the present invention. Referring to FIG. 2a, there is shown a window PIP that may comprise a full-screen input stream 205 and another windowed input stream 210. FIG. 2b illustrates an exemplary side-by-side PIP display, in accordance with an embodiment of the present invention. Referring to FIG. 2b, there is shown a side-by-side PIP that divides the viewing surface of a display into two regions 215 and 220 of the same size, sharing a common vertical boundary 225. Each region may be fully covered by an input stream (aspect ratio incorrect) or partially covered in letterbox format (aspect ratio correct). FIG. 2c illustrates an exemplary PIG display, in accordance with an embodiment of the present invention. Referring to FIG. 2c, for a PIG display mode, a display comprises a windowed input stream 230 and the rest of the viewing surface is covered by graphics 235.

In addition to the display modes, the display controller 100 may utilize different source modes for processing. Some exemplary source modes may comprise full screen (Full) and cropped. In Full source mode, an input stream may be sourced utilizing a whole screen. Some scaling is required to match the display resolution and aspect ratio. For example, a 1080i input stream may be scaled to 704×180 per field for a NTSC display. In cropped source mode, an input stream may be sourced using only a portion of the screen. This may be done when the source is determined to be letterbox source, or pan-scan is selected. In either case, only a portion of the available source material may be selected for viewing.

FIG. 3a illustrates an exemplary letterbox cropped source, in accordance with an embodiment of the present invention. Referring to FIG. 3a, the letterbox cropped source may occupy a portion 310 of the full screen 305. FIG. 3b illustrates an exemplary pan-scan cropped source, in accordance with an embodiment of the present invention. Referring to FIG. 3b, the pan-scan cropped source may occupy a portion 320 of the full screen 305.

FIG. 4 illustrates a flow diagram of an exemplary display pipeline, in accordance with an embodiment of the present invention. Referring to FIG. 4, the display pipeline may comprise an input buffer 405, a datapath 410, and an output buffer 415. The input buffer 405 may convert a bursty input data stream into a steady supply for the datapath 410 to enhance its performance. The datapath 410 may be any processing of the video such as, for example, a scaler, a compositor, etc. The output buffer 415 may perform two functions. First, in instances where the result of the processing in the datapath 410 is written to the main memory, the output buffer 415 may be used as a staging area for memory writes. Second, in instances where the result of the processing in the datapath 410 is displayed directly, the output buffer 415 may be used to smooth the dataflow.

In an embodiment of the present invention, the datapath 410 may comprise processes that may alter the data rate such as, for example, video scaling. Inserting a video scaler in the display pipeline may alter the data rate in a per pixel basis during horizontal scaling and in a per line basis in vertical scaling. Therefore, where the process of scaling takes place may affect the bandwidth of the memory in the display controller.

Figure 5:
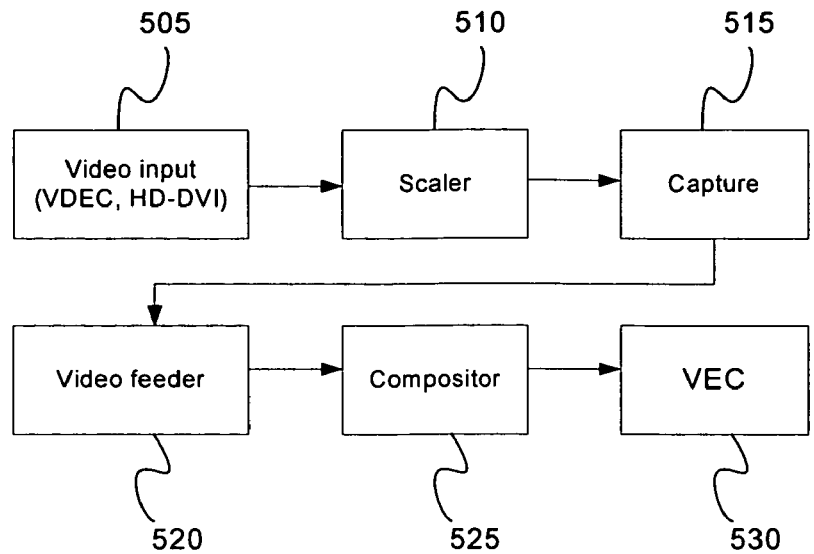
FIG. 5 illustrates a flow diagram of an exemplary dataflow with video input scaling-down, in accordance with an embodiment of the present invention.

Certain aspects of the present invention may comprise methods and systems that ensure optimal memory bandwidth based on the scaling process applied to the displayed video. FIG. 5 is a block diagram of an exemplary system that illustrates dataflow with video input scaling-down, in accordance with an embodiment of the present invention. Referring to FIG. 5, there is shown a video input 505, a scaler 510, a capture block 515, a video feeder 520, a compositor 525 and a VEC 530. The output of the video input block 505 may be coupled to an input of the scaler 510 and the output of the scaler 510 may be coupled to an input of the capture block 515. The output of the capture block 515 may be coupled to an input of the video feeder 520. An output of the video feeder 520 may be coupled to an input of the compositor 525 and an output of the compositor of 525 may be coupled to an input of the VEC 530. In the configuration of FIG. 5, the scaler 510 precedes capture block 515.

The video input 505 may comprise an input video stream, which may be in any one of a plurality of video formats. The scaler 510 may comprise hardware, software, or a combination thereof that may be capable of scaling input video 505 horizontally and/or vertically. The capture block 515 may comprise functionality capable of capturing an input video from the scaler 510 to memory. The video feeder 520 may oversee feeding the captured scaled video from memory to further processing such as, for example, the compositor 525. The compositor 525 may comprise functionality that may apply a layer to the video such as, for example, graphics, text, etc. The VEC 530 may then encode the video stream according to the requirements of the system and in a manner appropriate for the intended video decoder and display on which the video may be displayed.

In an embodiment of the present invention, for PIP and PIG images, the incoming video is usually scaled down. Scaling may be performed before capturing the input video or after the video feeder. A scale factor change may occur in situations such as, for example, changing to PIG or PIP display mode. The display controller may switch the display mode to PIP display mode, where a PIP window may utilize large scale-downs. Such large scale-downs may consume large bandwidth if done after the video feeder. In such a case it may be more efficient to use a scheme of input-scale-capture-feed-VEC as illustrated by FIG. 5, where the video input 505 may be initially scaled 510, then captured to memory 515. As a result, feeder 520 bandwidth may be conserved. Further processing such as, for example, compositing 525 may then be applied and sent to VEC 530. When the scaling 510 is performed prior to capturing 515, the video feeder 520 bandwidth may only need to support the pixel rate of the output, which may be smaller than the original input video.

The decision to use the scheme illustrated by FIG. 5, i.e., scaling then capturing may be based on whether scaling down may be needed. If scaling down, then the aforementioned scheme may be used. However, the decision may be based on other factors as will be shown hereinafter. For simplicity however, the scheme illustrated by FIG. 5 may be referred to as scaledown-capture.

In an embodiment of the present invention, the display controller may be in cropped images display mode, where the incoming video may be scaled up. A small portion of video may be selected for scaling up to fill the entire video frame store. Cropped images may either come from small, cropped regions or from letterbox source material that is cropped vertically to store as full screen. While scaling may be performed before or after the capture buffer, cropped input images generally need scaling-up to full size. Capture and video feeder bandwidth may be relieved when the scaling up is done after the video feeder. As a result it may be more efficient to use a scheme of input- capture-feed-scale-VEC as illustrated by FIG. 6, where the video input 605 may be initially captured to memory 610, sent through the video feeder 615, then scaled 620.

Figure 6:
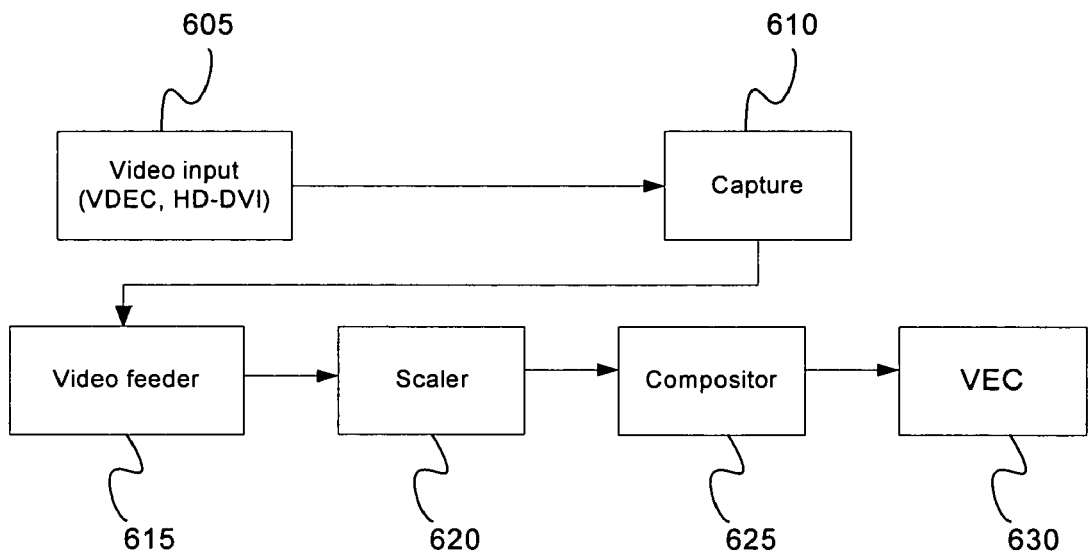
FIG. 6 illustrates a flow diagram of an exemplary dataflow with video input scaling-up, in accordance with an embodiment of the present invention.

FIG. 6 illustrates a flow diagram of an exemplary dataflow with video input scaling-up, in accordance with an embodiment of the present invention. Referring to FIG. 6, there is shown a video input 605, a capture block 610, a video feeder 615, a scaler 620, a compositor 625 and a VEC 530. An output of the video input block 605 may be coupled to an input of the capture block 610. An output of the capture block 610 may be coupled to an input of the video feeder 615 and an output of the video feeder 615 may be coupled to an input of the scaler 620. An output of the scaler 620 may be coupled to and input of the compositor of 625 and an output of the compositor may be coupled to an input of the VEC 630. In the configuration of FIG. 6, the capture block 610 precedes the scaler 620.

In operation, the video input 605 may comprise an input video stream, which may be in any one of a plurality of video formats. The capture 610 may comprise functionality capable of capturing an input video from the input block 605 to memory. The video feeder 615 may oversee feeding the captured video from memory to blocks where further processing may be applied to the video such as, for example, scaling 620 and compositing 625. The scaler 620 may comprise hardware, software, or a combination thereof that may be capable of scaling input video horizontally and/or vertically. The compositor 625 may comprise functionality that may apply a layer to the video such as, for example, graphics, text, etc. The VEC 630 may then encode the video stream according to the requirements of the system and in a manner appropriate for the intended video decoder and display on which the video may be displayed.

The decision to use the configuration illustrated by FIG. 6, which comprises capturing preceding scaling may be based on whether scaling up may be needed. If scaling up, then the aforementioned scheme may be used. However, the decision may be based on other factors as will be shown hereinafter. For simplicity however, the scheme illustrated by FIG. 6 may be referred to as capture-scaleup.

The decision to use the scaledown-capture scheme over the capture-scaleup scheme and vice versa may be done at the video input. In one video stream, changes in the type of input and the display mode may trigger making a decision as to the order in which scaling and capturing may be done. One goal of this decision is to minimize the capture bandwidth versus the feeder bandwidth. One effect of such a decision may be storing the least amount of data in the capture-playback buffers. In this regard, if the bandwidth for the scaledown-capture scheme is less than the bandwidth for the capture-scaleup, then scaledown-capture may be chosen, and vice versa. Making this decision may be achieved by comparing a scaledown-capture bandwidth estimate with a capture-scaleup bandwidth estimate.

The following simple approximation may be utilized to determine the scaledown-capture bandwidth estimate at the capture:

$$I_{Out} = O_x \times O_y, \quad (1)$$

where $I_{Out}$ may be the output scaled image size, $O_x$ the image output x dimension and $O_y$ the image output y dimension. Then the capture time, CaptTime may be calculated as follows:

$$CaptTime = \frac{Iline}{Iclk} \times Iy, \quad (2)$$

where Iline may be the input line samples per horizontal line (including hblank), Iclk the input pixel clock, and $I_y$ the image input y dimension. The estimate of the scaledown-capture bandwidth may then be:

$$I_{BW} = \frac{I_{Out}}{CaptTime}. \quad (3)$$

Similarly, the following approximation may be utilized to determine the capture-scaleup bandwidth estimate at the video feeder:

$$I_{In} = I_x \times I_y, \quad (4)$$

where $I_{In}$ may be the input scaled image size, $I_x$ the image input x dimension, and $I_y$ the image input y dimension. Then the feeder time, FeedTime may be calculated as follows:

$$FeedTime = \frac{Oline}{Oclk} \times Oy, \quad (5)$$

where Oline may be the output line samples per horizontal line (including hblank), Oclk the output pixel clock, and $O_y$ the image output y dimension. The estimate of the capture-scale up bandwidth may then be:

$$O_{BW} = \frac{I_{In}}{FeedTime}. \quad (6)$$

The decision is then made as follows: if the scaledown-capture bandwidth is larger than the capture-bandwidth then the best choice may be to perform capture prior to scale up. If the opposite is true, then the best choice may be to perform scaledown prior to capture.

In this regard, the decision may be determined as followed:

$$I_{BW} > O_{BW} \quad (7)$$

If this decision is true, then bandwidth may be conserved through capture-scaleup, where capture may run at the input pixel rate, and scaleup occurs after the video feeder as shown in FIG. 6. On the other hand, if this decision is false, then bandwidth may be conserved through scaledown-capture, where video feeder may run at the output pixel rate, and scaledown occurs before the video feeder as shown in FIG. 5.

The decision equation (7) takes into consideration the input rate and output rates, and as a result there may be times when the video is scaled up, but the usage calls for scaling before capture ("scaledown-capture"). Likewise, there may be times when the best option for scaled down images may utilize scaling after the video feeder ("capture-scaleup").

Equation (7) may be viewed as a test of ratios as well, comparing the ratio of input scaleup, ratio of input to output line time, and ratio of input to output clock. This may be further understood by expanding both sides of equation (7) using equations (1)-(6), which yields the following decision equation:

$$\frac{Sx \cdot Sy \cdot Sy \cdot Sline}{Sclk} \rangle 1.0, \quad (8)$$

where $S_x$ is the value $O_x/I_x$ (scale factor in X), $S_y$ is the value $O_y/I_y$ (scale factor in Y), Sline is the value Oline/Iline (line size change), and Sclk is the value Oclk/Iclk (rate change in pixel clock). If the left side of equation (8) is greater than 1.0, then bandwidth may be conserved through capture-scaleup, where capture may run at the input pixel rate, and scaleup occurs after the video feeder as shown in FIG. 6. On the other hand, if left side of equation (8) is less than 1.0, then bandwidth may be conserved through scaledown-capture, where video feeder may run at the output pixel rate, and scaledown occurs before the video feeder as shown in FIG. 5.

As can been seen in the above decision equations, the situation where the two values may be equal is not taken into account. One reason for that is if the greater-than sign in the decision equations (7) or (8) were to be replaced with a greater-or-equal-to sign, problems may arise in situation where the values may hover around the same value and may go back and forth between favoring one side over the other. This may be the case when some of the input formats may arrive from analog sources, and vary slightly over time. If an input format results in a decision metric very close to 1.0, the decision may oscillate as the input rate speeds or slows. Since most input rates are quite stable, and do not vary by more than 1 percent, the previous decision used from the last frame may be maintained if the rate is within some limited range such as, for example, 1 percent. If the decision were allowed to change rapidly, the effect of rapidly alternating between scaledown-capture and capture-scaleup may introduce different delays through the system, and may cause some frame skip at each transition. This may not be desirable in some systems.

Accordingly, a small region around 1.0 may be reserved to ensure decision oscillation does not occur. When the decision falls in the region around 1.0, which may be bounded for example by 0.99 and 1.01, the system may use whatever scheme was used on the last frame. As long as the input frame rate does not vary around this point by more than +/−1%, the system will be stable.

FIG. 7*a-f* illustrate examples of the impact of different decisions in video input capture scaling/cropping, in accordance with an embodiment of the present invention.

FIG. 7*a* shows an exemplary conversion from 480i Lbox to 1080i Full Screen. Referring to FIG. 7*a*, there is shown an input video 701. The format of the input 701 may be 480i Lbox at 720×180 per field, with 858 pixels/line at 13.5 MHz and 63.55 us/line. The output 710 may be video format 1080i Full Screen at 1920×540 per field, with 2200 pixels/line at 74.25 MHz, and 29.63 us/line. Therefore $S_x$ is 2.66, $S_y$ is 3, Sclk is 5.5, and Sline is 2.564. The left side of equation (8) is then 11.16, which is greater than 1.0 and therefore the capture-scaleup scheme is used.

FIG. 7*b* shows an exemplary conversion from 1080i Full Screen to 480i Lbox. Referring to FIG. 7*b*, there is shown an input video 711, which may be video format 1080i Full Screen at 1920×540 per field, with 2200 pixels/line at 74.25 MHz, and 29.63 us/line. The output 720 may be video format 480i Lbox at 720×180 per field, with 858 pixels/line at 13.5 MHz and 63.55 us/line. Therefore $S_x$ is 0.375, $S_y$ is 0.333, Sclk is 0.1818, and Sline is 0.390. The left side of equation (8) is then 0.0892, which is less than 1.0 and therefore the scaledown-capture scheme is used.

Figure 7C:
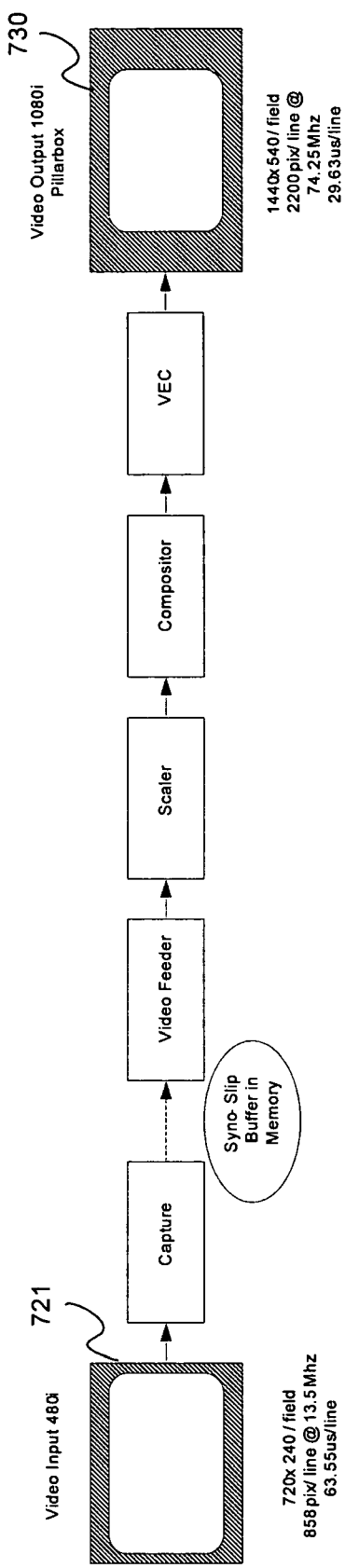

FIG. 7*c* shows an exemplary conversion from 480i to 1080i Pillarbox. Referring to FIG. 7*c*, there is shown an input 721, which may be video format 480i Pillarbox at 720×240 per field, with 858 pixels/line at 13.5 MHz and 63.55 us/line. The output 730 may be video format 1080i Pillarbox at 1440×540 per field, with 2200 pixels/line at 74.25 MHz, and 29.63 us/line. Therefore $S_x$ is 2.66, $S_y$ is 2.25, Sclk is 5.5, and Sline is 2.564. The left side of equation (8) is then 6.277, which is greater than 1.0 and therefore the capture-scaleup scheme is used.

Figure 7D:
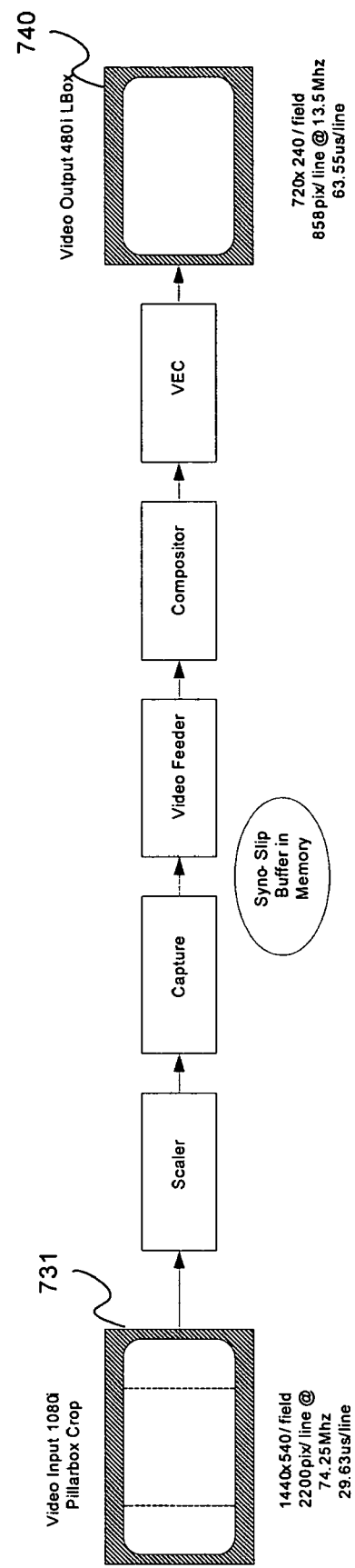

FIG. 7*d* shows an exemplary 1080i Pillarbox Crop to 480i. Referring to FIG. 7*d*, there is shown an input 731, which may be video format 1080i Pillarbox at 1440×540 per field, with 2200 pixels/line at 74.25 MHz, and 29.63 us/line. The output 740 may be video format 480i Pillarbox at 720×240 per field, with 858 pixels/line at 13.5 MHz and 63.55 us/line. Therefore $S_x$ is 0.50, $S_y$ is 0.444, Sclk is 0.1818, and Sline is 0.390. The left side of equation (8) is then 0.2114, which is less than 1.0 and therefore the scaledown-capture scheme is used.

FIG. 7*e* shows an exemplary conversion from 1024×768 Lbox to 1080i Full Screen. Referring to FIG. 7*e*, there is shown an input 741, which may be video format 1024×768 Lbox at 1024×576 per field, with 1344 pixels/line at 65 MHz and 20.676 us/line. The output 750 may be video format 1080i Full Screen at 1920×540 per field, with 2200 pixels/line at 74.25 MHz, and 29.63 us/line. Therefore $S_x$ is 1.875, $S_y$ is 0.9375, Sclk is 1.1423, and Sline is 1.637. The left side of equation (8) is then 2.36, which is greater than 1.0 and therefore the capture-scaleup scheme is used. In this example, the vertical dimension is actually a scale-down, however, due to the overall data rates increasing after the scaler, it is more beneficial to implement the scale after the capture.

FIG. 7*f* shows an exemplary conversion from 1080i Full Screen to 1024×768 Lbox. Referring to FIG. 7*f*, there is shown an input 751, which may be video format 1080i Full Screen at 1920×540 per field, with 2200 pixels/line at 74.25 MHz, and 29.63 us/line. The output 760 may be video format 1024×768 Lbox at 1024×576 per field, with 1344 pixels/line at 65 MHz and 20.676 us/line. Therefore $S_x$ is 0.533, $S_y$ is 1.0666, Sclk is 0.8754, and Sline is 0.6109. The left side of equation (8) is then 0.4227, which is less than 1.0 and therefore the capture-scaleup scheme is used. In this example, the vertical scale-up occurs prior to capture, however, due to the overall data rate reduction, it is more beneficial to implement the scale before the capture.

Therefore, the overall system bandwidth may be optimized by choosing how to crop/scale and capture/playback video. Performing such decisions may allow arbitrary cropping and scaling on video inputs without hitting cases of extreme bandwidth. Using the simple equation (8) for the decision on video inputs may optimize the bandwidth.

This approach of cropping, scaling, capture and playback, respectively, may result in significant bandwidth savings. A large degree of flexibility to the user for cropping images to different sizes without encountering bandwidth constraints may be allowed with the system described herein. This system may be general enough to scale to any image size and pixel rate.

Figure 8:
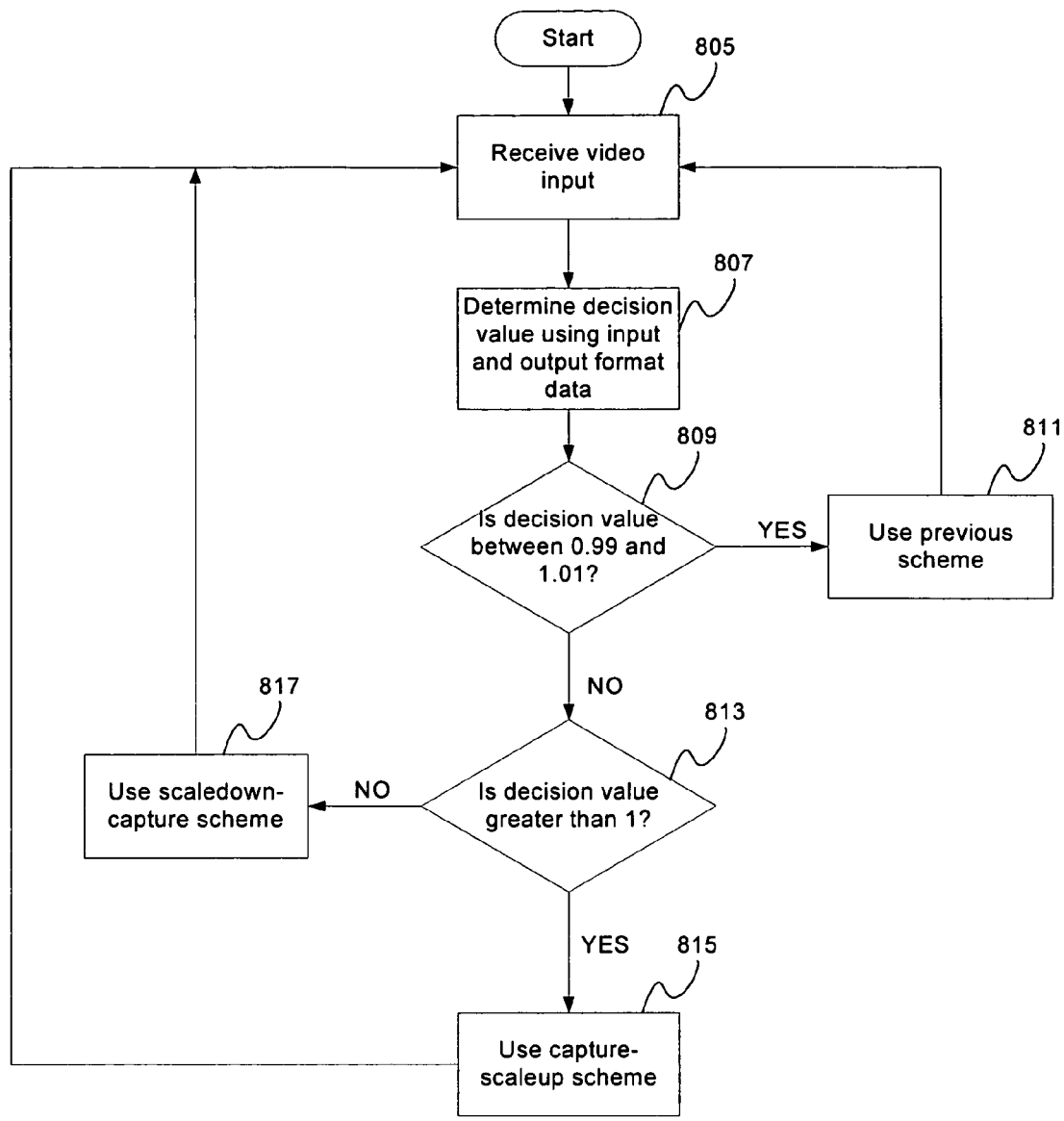
FIG. 8 illustrates a flow chart of an exemplary method of ordering scaling and capturing in a video system, in accordance with an embodiment of the present invention.

FIG. 8 illustrates a flow chart of an exemplary method of ordering scaling and capturing in a video system, in accordance with an embodiment of the present invention. The method may start when a current video field may be received at an input at 805. At 807, a decision value may be determined using information associated with the input video format and the output video format. The decision value may be for example the left side of equation (8). At a decision block 809 it may be determined whether the decision value may be within an oscillation region of 1% around the decision threshold value 1 (right side of equation (8)). If the decision value is within 1% of 1, then the scheme used with the previous field may be used at 811. For example, if the scaledown-capture was used for the previous field, then scaledown-capture may be utilized for the current field. The process may then return to block 805 to receive the next field.

If at decision block 809 it is determined that the decision value is beyond the 1% oscillation region, the decision value may be examined at a decision block 813. If the decision value is greater than 1, at a next block 815 the capture-scaleup scheme may be utilized with the current field. The process may then return to block 805 to receive the next field. If at the decision block 813 it is determined that the decision value is less than 1, at a next block 817 the scaledown-capture scheme may be utilized with the current field. The process may then return to block 805 to receive the next field.

Figure 9:
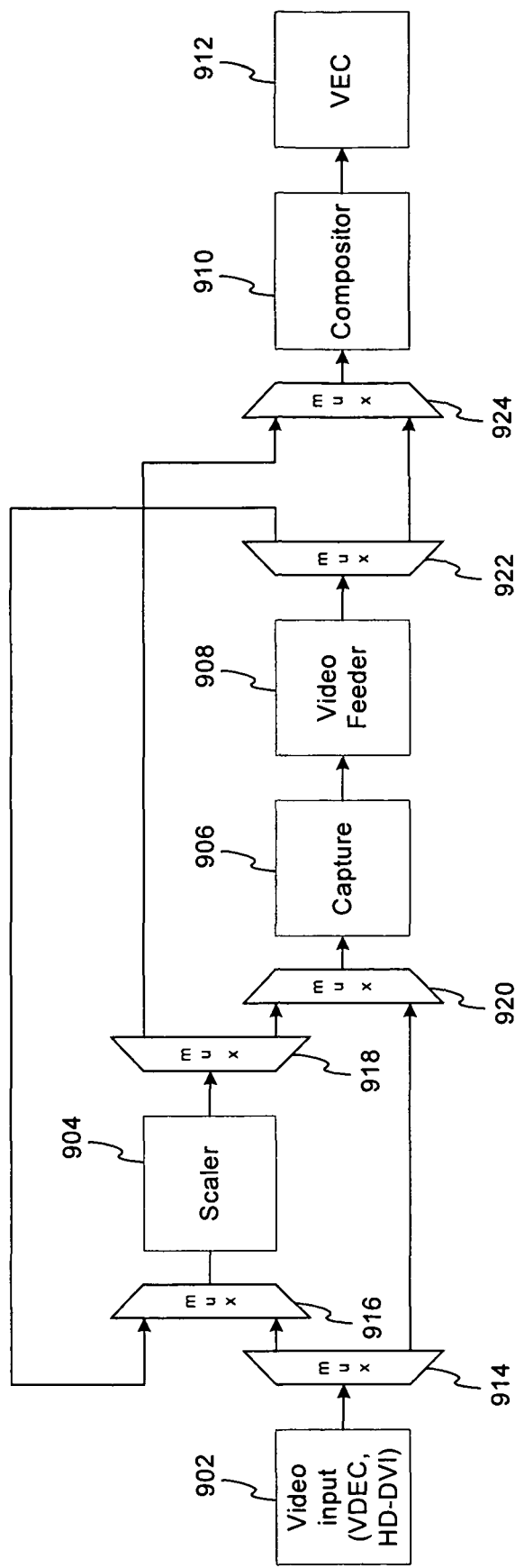
FIG. 9 illustrates a block diagram of an exemplary system that supports selection of processing configurations, in accordance with an embodiment of the present invention.

FIG. 9 illustrates a block diagram of an exemplary system that supports selection of processing configurations, in accordance with an embodiment of the present invention. The processing configurations may be, for example, the configurations illustrated by FIG. 5 and FIG. 6. Referring to FIG. 9, there is shown an input 902, which may be any one of a plurality of video formats supported by the system. The video format of the input 902 may then be used to drive a mux 914, which may be used as an input to mux 916, in which case the scaler 904 may be selected to do the processing first, and hence selecting the configuration of FIG. 5. Alternatively, the output of mux 914 may drive mux 920, in which case the capture block 906 may be selected to initiate the processing, and hence selecting the configuration of FIG. 6. Based on selected path, mux 922 and mux 918 may be used to select the correct path based on the process that initially executed, and accordingly processing according to either the configuration of FIG. 5 or the configuration of FIG. 6. The outputs associated with the scaling and capturing processes may then be used to drive mux 924, which may proceed to the compositor 910 when both the scaling and capturing have been executed, and following the compositor 910, the video may be sent to the VEC 912 to complete the video processing. As such, the system of the present invention may be adapted to support several configurations and may have the capability to switch between the configurations based on the input video type. Having the capability to select among different configurations of processing may optimize the bandwidth of the system for any video formats that may be input into the system.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing video information in a display controller, the method comprising:
   calculating with a circuit, for a current field based on a video format of said current field and an output video format, a first memory bandwidth estimate associated with performing scaling of the current field prior to performing capturing of the current field;
   calculating, with the circuit, a second memory bandwidth estimate associated with performing capturing of the current field prior to performing scaling of the current field;
   performing scaling of the current field prior to performing capturing of the current field when the second memory bandwidth estimate is greater than the first memory bandwidth estimate; and
   performing capturing of the current field before performing scaling of the current field when the first memory bandwidth estimate is greater than the second memory bandwidth estimate.

2. The method according to claim 1, further comprising the step of selecting one of:
   performing scaling prior to performing capturing, and performing capturing before performing scaling, during processing by the display controller when the first memory bandwidth estimate and the second memory bandwidth estimate are equal.

3. The method according to claim 1, further comprising determining said first memory bandwidth estimate and the said second memory bandwidth estimate based upon:
   input and output video dimensions;
   input and output line samples per horizontal line; and
   input and output pixel clocks.

4. The method according to claim 1, further comprising determining whether there is oscillation associated with the first memory bandwidth estimate and the second memory bandwidth estimate.

5. The method according to claim 4, wherein the step of determining whether there is oscillation further comprises determining whether, for a current field, a larger of the first memory bandwidth estimate and the second memory bandwidth estimate is not the larger for a subsequent field.

6. The method according to claim 5, further comprising, if there is oscillation, performing said scaling and said capturing similar to scaling and capturing used with a field that precedes said current field.

7. The method of claim 1, wherein the first memory bandwidth estimate associated with performing scaling of the current field prior to performing capturing of the current field is based upon the output scaled image size and a capture time, wherein the capture time is based upon an input line samples per horizontal line, an input pixel clock, and an image input y dimension.

8. The method of claim 1, wherein the second memory bandwidth estimate associated with performing capturing of the current field prior to performing scaling of the current field is based upon an input scaled image size and a feeder time, wherein the feeder time is based upon an output line samples per horizontal line, an output pixel clock and an image output y dimension.

9. A non-transitory machine-readable storage having stored thereon, a computer program having at least one code section for processing video information in a display controller, the at least one code section being executable by a machine for causing the machine to perform steps comprising:

calculating for a current field based on a video format of said current field and an output video format, a first memory bandwidth estimate associated with performing scaling of the current field prior to performing capturing of the current field;

calculating a second memory bandwidth estimate associated with performing capturing of the current field prior to performing scaling of the current field;

performing scaling of the current field prior to performing capturing of the current field when the second memory bandwidth estimate is greater than the first memory bandwidth estimate; and performing capturing of the current field before performing scaling of the current field when the first memory bandwidth estimate is greater than the second memory bandwidth estimate.

10. The machine-readable storage according to claim 9, further comprising code for selecting one of:

performing scaling prior to performing capturing, and performing capturing before performing scaling, during processing by the display controller when the first memory bandwidth estimate and the second memory bandwidth estimate are equal.

11. The non-transitory machine-readable storage according to claim 9, further comprising code for determining said first memory bandwidth estimate and the said second memory bandwidth estimate based upon:

input and output video dimensions;
input and output line samples per horizontal line; and
input and output pixel clocks.

12. The non-transitory machine-readable storage according to claim 9, further comprising code for determining whether there is oscillation associated with the first memory bandwidth estimate and the second memory bandwidth estimate.

13. The non-transitory machine-readable storage according to claim 12, wherein the code for determining whether there is oscillation further comprises code that determines whether, for a current field, a larger of the first memory bandwidth estimate and the second memory bandwidth estimate is not the larger for a subsequent field.

14. The non-transitory machine-readable storage according to claim 13, further comprising code for performing said scaling and said capturing similar to scaling and capturing used with a field that precedes said current field, if there is oscillation.

15. A system for processing video information in a display controller, the system comprising:

at least one processor that calculates for a current field based on a video format of said current field and an output video format, a first memory bandwidth estimate associated with performing scaling of the current field prior to performing capturing of the current field;

said at least one processor calculating a second memory bandwidth estimate associated with performing capturing of the current field prior to performing scaling of the current field;

said at least one processor performs scaling of the current field prior to performing capturing of the current field when the second memory bandwidth estimate is greater than the first memory bandwidth estimate; and said at least one processor performs capturing of the current field before performing scaling of the current field when the first memory bandwidth estimate is greater than the second memory bandwidth estimate.

16. The system according to claim 15, wherein said at least one processor selects one of:

performing scaling prior to performing capturing, and performing capturing before performing scaling, during processing by the display controller, when the first memory bandwidth estimate and the second memory bandwidth estimate are equal.

17. The system according to claim 15, wherein said at least one processor determines said first memory bandwidth estimate and the said second memory bandwidth estimate based upon:

input and output video dimensions;
input and output line samples per horizontal line; and
input and output pixel clocks.

18. The system according to claim 15, wherein said at least one processor determines whether there is oscillation associated with the first memory bandwidth estimate and the second memory bandwidth estimate.

19. The system according to claim 15, wherein said at least one processor determines whether there is oscillation by determining whether, for a current field, a larger of the first memory bandwidth estimate and the second memory bandwidth estimate is not the larger for a subsequent field.

20. The system according to claim 19, wherein said at least one processor performs said scaling and said capturing similar to scaling and capturing used with a field that precedes said current field, if there is oscillation.

21. A system, comprising:

at least one processor; and
logic executable by the at least one processor, the logic comprising:

means for calculating, for a current field based on a video format of said current field and an output video format, a first memory bandwidth estimate associated with performing scaling of the current field prior to performing capturing of the current field;

means for calculating, a second memory bandwidth estimate associated with performing capturing of the current field prior to performing scaling of the current field;

means for performing scaling of the current field prior to performing capturing of the current field when the second memory bandwidth estimate is greater than the first memory bandwidth estimate; and means for performing capturing of the current field before performing scaling of the current field when the first memory bandwidth estimate is greater than the second memory bandwidth estimate.

* * * * *